US012518939B2

United States Patent
Bhokse et al.

(10) Patent No.: US 12,518,939 B2
(45) Date of Patent: Jan. 6, 2026

(54) ORIENTATION AGNOSTIC BATTERY PLACEMENT

(71) Applicant: Target Brands, Inc., Minneapolis, MN (US)

(72) Inventors: Sanjay Bhokse, Bengaluru (IN); Sunay Narkar, Bengaluru (IN); Sandeep Tammana, Bengaluru (IN); Anup Jayapal Rao, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 700 days.

(21) Appl. No.: 17/681,525

(22) Filed: Feb. 25, 2022

(65) Prior Publication Data

US 2023/0274900 A1    Aug. 31, 2023

(51) Int. Cl.
 *H02J 7/00* (2006.01)
 *H01H 50/54* (2006.01)
 *H01H 57/00* (2006.01)

(52) U.S. Cl.
 CPC ........... *H01H 50/54* (2013.01); *H02J 7/0034* (2013.01); *H02J 7/0045* (2013.01); *H01H 2057/003* (2013.01)

(58) Field of Classification Search
 CPC . H01H 50/54; H01H 2057/003; H02J 7/0034; H02J 7/0045; Y02E 60/10
 USPC ........................................................ 320/103
 See application file for complete search history.

(56) References Cited

U.S. PATENT DOCUMENTS

| | | | |
|---|---|---|---|
| 4,423,456 A | 12/1983 | Zaidenweber | |
| 4,855,662 A * | 8/1989 | Yang | H02J 7/0034 320/DIG. 15 |
| 5,623,550 A | 4/1997 | Killion | |
| 6,825,577 B2 | 11/2004 | Soto et al. | |
| 8,654,549 B2 | 2/2014 | Janning | |
| 9,263,903 B2 | 2/2016 | Newton | |
| 9,768,772 B1 * | 9/2017 | Khamashta | H03K 17/6871 |
| 2004/0150373 A1 * | 8/2004 | Chan | H02J 7/342 320/165 |
| 2023/0318321 A1 * | 10/2023 | Liu | H02J 7/0047 320/105 |

* cited by examiner

*Primary Examiner* — Zixuan Zhou
(74) *Attorney, Agent, or Firm* — Merchant & Gould P.C.

(57) ABSTRACT

In general, the subject matter of the disclosure relates to an orientation agnostic battery placement device. Connecting a battery in a reversed polarity configuration may cause the battery-powered electronic devices to not work or in some cases may even cause damage to the device itself. The disclosed orientation agnostic battery placement device includes a latch relay device that includes a first latch switch that electrically connects the first and second terminals of a battery compartment to the positive and negative electrical power connections of a load circuitry associated with the battery-powered electronic device respectively when the battery received within the battery compartment is in a first orientation and a second switch that electrically connects the first and second terminals of the battery compartment to the negative and positive electrical power connections of the load circuitry respectively when the battery received within the battery compartment is in a second orientation.

18 Claims, 4 Drawing Sheets

ORIENTATION AGNOSTIC BATTERY PLACEMENT

BACKGROUND

A battery is a source of electric power consisting of one or more electrochemical cells for powering electrical devices such as consumer electronics like flashlights, mobile phones, cameras and electric cars. When a battery is supplying electric power, its positive terminal is the cathode and its negative terminal is the anode. The terminal marked negative is the source of electrons that will flow through an external electric circuit to the positive terminal. When a battery is connected to an external electric load, a redox reaction converts high-energy reactants to lower-energy products, and the free-energy difference is delivered to the external circuit as electrical energy. It is therefore essential that the battery terminals are connected to an external device with the correct orientation for the battery to produce the electric energy needed to power the device and the device to not be damaged.

SUMMARY

Embodiments of the disclosure are directed to an orientation agnostic battery placement circuit.

In a first embodiment, a battery-powered electronic device is disclosed. The battery-powered electronic device comprises load circuitry having a positive electrical power connection and a negative electrical power connection; a battery compartment having a first terminal and a second terminal, the battery compartment being arranged and configured for receipt of a battery having a positive terminal and a negative terminal; a latch relay electrically connected between the load circuitry and the first and second terminals of the battery compartment, the latch relay comprising: a first latch switch electrically connected to the first terminal, the first latch switch connecting the first terminal to: the positive electrical power connection of the load circuitry, in a state where the first terminal is electrically contacted by the positive terminal of the battery; and the negative electrical power connection of the load circuitry, in a state where the first terminal is electrically contacted by the negative terminal of the battery; and a second latch switch electrically connected to the second terminal, the second latch switch connecting the second terminal to: the negative electrical power connection of the load circuitry, in a state where the second terminal is electrically contacted by the negative terminal of the battery; and the positive electrical power connection of the load circuitry, in a state where the second terminal is electrically contacted by the positive terminal of the battery.

In a second embodiment, a battery-powered electronic device is disclosed. The battery-powered electronic device comprises: load circuitry having a positive electrical power connection and a negative electrical power connection; a battery compartment having a first terminal and a second terminal, the battery compartment being arranged and configured for receipt of a battery having a positive terminal and a negative terminal; a latch relay, connected between the load circuitry and the first and second terminals of the battery compartment, the latch relay having a first input terminal, a second input terminal, a first latch switch and a second latch switch and being configured to: upon receiving an input current between the first input terminal and the second input terminal in a first direction, actuate the first latch switch to connect the first terminal of the battery compartment to the positive electrical power connection of the load circuitry and second terminal of the battery compartment to the negative electrical power connection of the load circuitry; and upon receiving the input current between the first input terminal and the second input terminal in a second direction, actuate the first latch switch to connect the first terminal of the battery compartment to the negative electrical power connection of the load circuitry and the second terminal of the battery compartment to the positive electrical power connection of the load circuitry; and a latch bias circuit electrically connected to the first terminal and the second terminal of the battery compartment and configured to control the direction of the input current between the first input terminal and the second input terminal of the latch relay based on an orientation of the battery received within the battery compartment.

In a third embodiment, an orientation agnostic battery placement device is disclosed. The orientation agnostic battery placement device comprises: a battery compartment having a first terminal and a second terminal, the battery compartment being arranged and configured for receipt of a battery having a positive terminal and a negative terminal; a latch relay comprising: a first output terminal; a second output terminal; a first latch switch electrically connected to a first terminal of a battery compartment, the first latch switch connecting the first terminal to: the first output terminal, in a state where the first terminal is electrically contacted by a positive terminal of a battery; and the second output terminal, in a state where the first terminal is electrically contacted by a negative terminal of the battery; and a second latch switch electrically connected to a second terminal of the battery compartment, the second latch switch connecting the second terminal to: the second output terminal, in a state where the second terminal is electrically contacted by the negative terminal of the battery; and the first output terminal, in a state where the second terminal is electrically contacted by the positive terminal of the battery; and a latch bias circuit electrically connected between the latch relay and the first and second terminals of the battery compartment.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
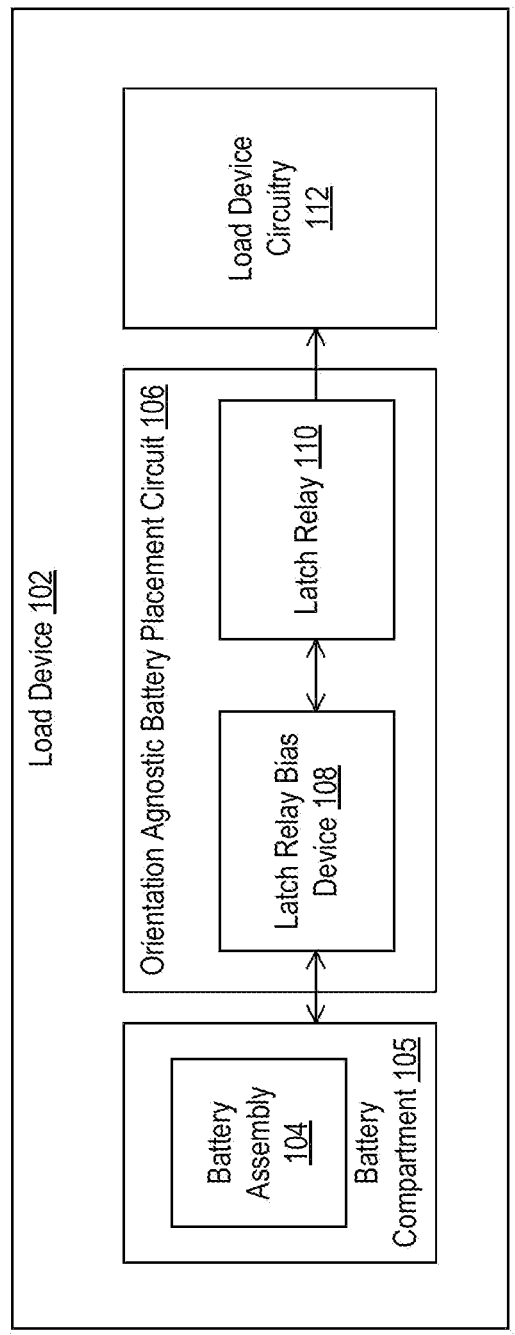
FIG. 1 illustrates an example electronic device including an orientation agnostic battery placement circuit.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, devices that use batteries as a power source include an access panel to a battery compartment that allows the user to install or replace batteries. Such access and installation by a user increases the possibility of human errors. One type of human error that is frequently encountered is a battery polarity error that occurs when the user inserts the battery in the device with a reversed polarity. In such a case, the positive terminal of the battery may be connected to the negative power terminal of the device and vice versa. Connecting the battery in a reversed polarity configuration may cause the device to not work or in some cases may even cause damage to the device itself.

The disclosed orientation agnostic battery placement circuit allows the user to install a battery, or battery assembly including one or more batteries, in any orientation while still generating the electrical energy to power the device in which the circuit is incorporated. The orientation agnostic battery placement circuit may also be configured to prevent any damage to the device that may be caused by the mis-installed battery or battery assembly (with batteries and battery assemblies being collectively referred to herein as battery assemblies).

Battery capacity is the total amount of electricity generated by the battery assembly due to electrochemical reactions in each battery. Battery capacity is typically measured in ampere hours. The amount of electrical energy that can be extracted from the battery may be finite. Therefore, it is important that the disclosed orientation agnostic battery placement circuit use minimal electrical charge from the battery to accomplish its function, in order to conserve and extend the battery capacity and therefore maximize the battery capacity for providing electrical energy to the load device itself rather than the orientation agnostic battery placement circuit.

The disclosed orientation agnostic battery placement circuit uses a latch relay in fixing the polarity voltage to the load in cases where the battery is installed in reverse. The disclosed circuit includes two NMOS transistors, two capacitors and a latch relay.

A latch relay is a relay that is set ON or reset OFF by the input of a pulse voltage. Even after the input voltage is interrupted, the relay maintains its set or reset condition until it receives the next inverting input. There are different types of latching relays, including magnetic latching relays and mechanical latching relays.

The disclosed circuit includes battery placement terminals in a battery compartment that are connected to the latch relay circuit. The latch relay circuit is used to reverse the polarity of the battery output when the battery assembly is connected in reverse. The disclosed circuit also includes a pair of NMOS transistors, with each NMOS transistor connected to a capacitor at the gate terminal. The NMOS transistors and gate capacitors are used to bias the current input of the latch relay such that the latch relay may switch between two pathways that connect the positive and negative terminals of the battery compartment to the positive and negative load terminals.

The disclosed orientation agnostic battery placement circuit may be configured to only use the electrical energy from the battery assembly momentarily to charge the capacitors which in turn bias the transistors. Therefore, the battery capacity is only minimally used in the operation of the disclosed orientation agnostic battery placement circuit, which maximizes the battery capacity for supplying electrical energy to power the load device itself. For example, the disclosed battery assembly only requires power to bias the orientation agnostic battery placement circuit momentarily when the batteries are inserted. Once the latch relay circuit has been biased and the switches are set, the orientation agnostic battery placement circuit no longer requires any additional power to continue to be operational.

The disclosed orientation agnostic battery placement circuit may be used in any device that requires the installation of batteries to power the device. One example use for the disclosed orientation agnostic battery placement circuit is in image capture devices, such as cameras, that may be used to periodically capture images of a particular view, including a view of a shelf within a store. Such imaging devices may be placed in difficult to reach locations and angles, making battery installation difficult. Thus, the disclosed orientation agnostic battery circuit may prevent operational failure of the image capture device due to the mis-installation of batteries, while also extending the time between battery replacements.

In example embodiments, the orientation agnostic battery placement circuit may be integrated within an electrical device, or may be a separate device that can be electrically connected to such a device. Such possible configurations are collectively referred to as incorporating the orientation agnostic battery placement circuit within a battery-powered device.

FIG. 1 illustrates an example electrical device 100 including orientation agnostic battery placement circuit.

In some examples, the electrical device 100 may include a load device 102 electrically connected to a battery assembly 104 via an orientation agnostic battery placement circuit 106 to supply power to the load device circuitry 112 of the load device 102. For example, the load device 102 may include any device that relies on an external power source. In some examples, the load device 102 may include a housing that is configured to receive power from the external power source. While the disclosed examples include a battery assembly 104 as the external power source, in other examples, other types of external power sources are also possible.

In some examples, the battery assembly 104 may include one or more batteries. The battery assembly 104 may include positive and negative terminals. Commonly used types of batteries include alkaline batteries, nickel metal hydride batteries, and lithium-ion batteries among others. Some commonly used battery sizes include AA batteries, AAA batteries, C batteries, D batteries, 9V batteries, and CR2032 batteries among others. An example of the battery assembly is described in greater detail in relation to FIG. 2.

In the disclosed example, the battery assembly 104 may provide from the one or more batteries via terminals included within a battery compartment, regardless of the orientation in which the one or more batteries are connected. For example, the battery assembly 104 may provide power when the positive terminal of the battery assembly 104 is connected to the positive terminal of the battery compartment, and the negative terminal of the battery assembly 104 is connected to the negative terminal of the battery compartment; the battery assembly 104 may also provide power when the positive terminal of the battery assembly 104 is connected to the negative terminal of the battery compartment and when the negative terminal of the battery assembly 104 is connected to the positive terminal of the battery compartment.

In example embodiments, the battery compartment 105 can be any of a variety of locations configured to receive a battery, and including at least a positive terminal and a negative terminal positioned and electrically connected to receive complementary terminal connections of a battery assembly, for providing power to the electronic device to which the battery compartment 105 is electrically connected. In some examples, the battery compartment is an enclosed or encloseable receptacle for one or more batteries, either individually or within a separate battery structure in which batteries are encased (either of which referred to as a battery assembly herein). In other examples, the battery compartment may not entirely enclose a battery that is to be electrically connected to an electronic device, but instead simply represents a location at which battery terminals may be connected to a battery assembly. In some examples, the battery compartment 105 may include other electrical elements, such as switches (as described below) or other types of current or voltage control devices.

In some examples, the orientation agnostic battery placement circuit 106 is configured to connect to the battery assembly 104 and facilitate the operation of the load device 102 irrespective of the orientation of the installed batteries. For example, typically, when the one or more batteries are installed with the positive terminal of a battery connected to the negative terminal of the battery assembly 104, the battery may be considered to be oriented incorrectly. As such, the electrical current generated by the batteries may be backwards, which may damage the load device 102 or prevent the load device 102 from being functional at the very least. The orientation agnostic battery placement device 106 re-orients or fixes the direction of the output current from the battery assembly 104 when one or more of the batteries included within the battery assembly 104 are oriented incorrectly.

In some examples, the orientation agnostic battery placement device 106 may include a latch relay bias device 108 and a latch relay device 110 that may be configured to reverse the polarity of the output power. The latch relay bias device 108 may be configured to bias the latch relay device 110 based on the direction of the current flow from the battery assembly 104. The latch relay device 110 may be configured to either keep the polarity of the output power from the battery assembly 104 the same or reverse the polarity of the power from the battery assembly 102 depending on the biasing of the latch relay device 110. The configuration and operation of the orientation battery placement device 106 is described in greater detail in relation to FIG. 2.

In some examples, the load device circuitry 112 may be circuitry associated with the operation of the load device 102 that require a power source to operate. For example, the orientation agnostic battery placement device 106 may supply the load device circuitry 112 with power that matches the polarity expectations of the load device circuitry 112. In some examples, without the orientation agnostic battery placement device 106, the load device circuitry 112 may be damaged if it lacks a blocking diode. In such a case, devices that should never be forward biased may become overheated and destroyed if the load device circuitry 112 are biased with the incorrect power supply polarity.

Figure 2:
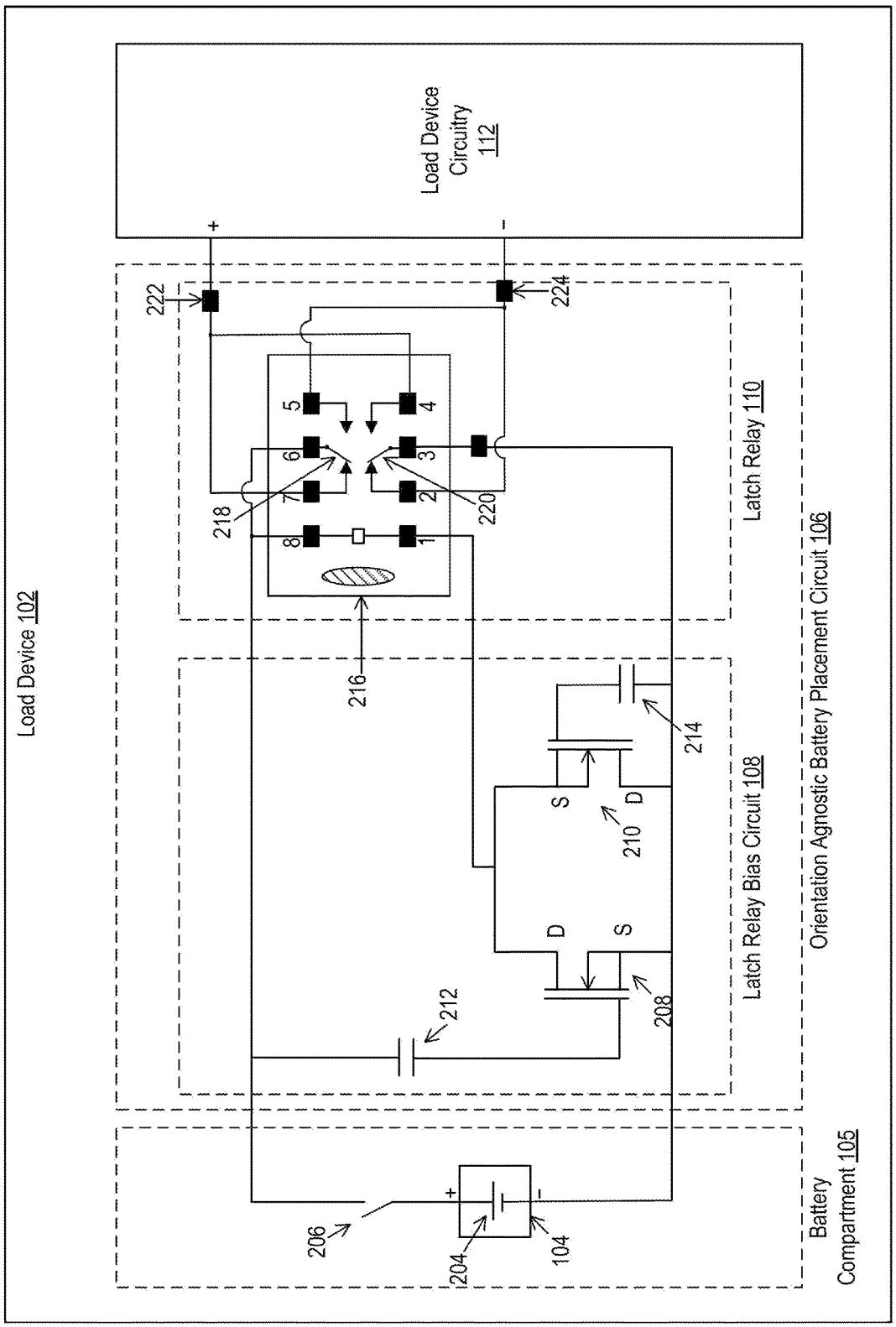
FIG. 2 illustrates a detailed example configuration of an electronic device including an orientation agnostic battery placement circuit from FIG. 1.

FIG. 2 illustrates a detailed example configuration of the orientation agnostic battery placement system from FIG. 1.

In some examples, the battery assembly 104 may be installable at a battery compartment 105, which includes a switch 206. The one or more batteries 204 included within battery assembly 104 are configured to supply power to the load device circuitry 112 of the load device 102. The switch 206 may be configured to control the connection between the one or more batteries 204 installed within the battery compartment 105 and the orientation agnostic battery placement circuit 106. For example, when the switch 206 is turned on, the one or more batteries 204 may provide power to the orientation agnostic battery placement circuit 106 and when the switch 206 is turned off, the one or more batteries 204 may be disconnected from the orientation agnostic battery placement circuit 106, thus cutting off power to the orientation agnostic battery placement circuit 106.

In alternative embodiments, the switch 206 may be positioned apart from the battery compartment 105, but will be electrically connected between the battery compartment 105 and the orientation agnostic battery placement circuit 106.

In some examples, the latch relay bias circuit 108 is configured to be connected to the battery assembly 104 and the latch relay 110. The latch relay bias circuit 108 may control the direction of current flow that is input into the latch relay based on the orientation of the one or more batteries 204 installed within the battery compartment 105.

For example, the latch relay bias circuit 108 may include a pair of transistors 208, 210 that are connected together. For examples, the pair of transistors 208, 210 may be metal oxide semiconductor field-effect transistor (MOSFET) devices. In some examples, the pair of transistors 208, 210 may be NMOS MOSFET devices. In other examples, other types of MOSFET devices or other types of transistor devices may be used.

For example, each of the pair of transistors 208, 210 includes a drain terminal, source terminal and a gate terminal. For example, the drain terminal of transistor 208 and source terminal of transistor 210 may be connected to an input terminal of the latch relay 110. The source terminal of transistors 208 and drain terminal of transistor 210 may be connected to the negative terminal of the battery compartment. The gate terminal of the transistor 208 may be connected to a first terminal of capacitor 212, wherein the second terminal of the capacitor 212 may be connected to the switch 206. In other examples where a switch 206 is not used, the second terminal of the capacitor 212 may be connected directly to the positive terminal of the battery compartment 105. The gate terminal of the transistor 210 may be connected to a first terminal of capacitor 214, wherein the second terminal of the capacitor 214 may be connected to the negative terminal of the battery compartment 105.

In some examples, where the transistors 208 and 210 are implemented using NMOS transistors, the transistor 208 may be turned on such that current flows from the drain terminal to the source terminal of the transistor 208 when the gate-source voltage of the transistor 208 is greater than a threshold voltage associated with the transistor 208. For example, when the one or more batteries 204 are installed in the battery compartment such that the positive terminal of the one or more batteries is installed to align with the positive terminal of the battery compartment and negative terminal(s) of the one or more batteries 204 are installed to align with the negative terminal of the battery compartment 105, and the switch 206 is closed, the capacitor 212 charges up causing the gate-source voltage of the transistor 208 to be greater than the threshold voltage associated with the transistor 208, thus turning on the transistor 208 momentarily and causing a current to flow from the drain terminal to the source terminal of the transistor 208.

Similarly, in some examples, where the transistors 208 and 210 are implemented using NMOS transistors, the transistor 210 may be turned on such that current flows from the drain terminal to the source terminal of the transistor 210 when the gate-source voltage of the transistor 210 is greater than a threshold voltage associated with the transistor 210. For example, when the one or more batteries 204 are installed in the battery compartment 105 such that the positive terminal of the one or more batteries is installed to align with the negative terminal of the battery compartment 105 and negative terminal of the one or more batteries 204 are installed to align with the positive terminal of the battery compartment 105, and the switch 206 is closed, the capacitor 214 charges up causing the gate-source voltage of the transistor 210 to be greater than the threshold voltage associated with the transistor 210, thus turning on the transistor 210 momentarily and causing a current to flow from the drain terminal to the source terminal of the transistor 210.

In some examples, the latch relay 110 includes a latch relay circuit 216. In some examples, the latch relay circuit 216 is a relay circuit that maintains its contact position even after the control power has been removed. For example, latch relays are circuits that use a minimal amount of current to activate one or more switches. Once the switches are actuated, a latch relay does not require continuous application of current in order for the switches to hold their position. Rather the switches remain in the same position until a current with a reverse polarity is received by the latch relay, at which point the switches may be actuated to a different position.

For example, a latch relay may include terminals or solenoids made from one or more wire coils and a metal strip or armature that may be used to transition between the two coils and provide the on/off gateway to the rest of the circuit. When subjected to a brief pulse of input current, the coils in a latch relay may generate a magnetic field that pushes or pulls the armature that is suspended between them. The pushing or pulling of the armature may cause the switch to move between two separate circuits. Different types of latch relay circuits include magnetic latching relays, mechanical latching relays and impulse relays among other types of latching relays.

In one example, the latch relay circuit 216 may be implemented using a discrete magnetic latch relay circuit component. Other types of latch relay circuits may also be used in implementing the latch relay circuit 216. For example, any latch relay circuit that may actuate a switch between a first and second terminal based on the polarity of an input current pulse and hold the position of the switch until another input current pulse of a reverse polarity is received can be used to implement the latch relay circuit 216.

For example, the latch relay circuit 216 may include 8 terminals. In other examples, the latch relay circuit 216 may include more or less number of terminals. In the disclosed example latch relay circuit 216, terminals 8 and 1 may represent input terminals. For example, terminal 8 may be connected to the switch 206 and terminal 1 may connect to the latch relay bias circuit 108. In examples where a switch 206 is not implemented, terminal 8 of the latch relay circuit 216 may be directly connected to the positive terminal of the battery compartment 105. Terminal 6 and terminal 3 may be connected to switches 218 and 220 that toggle between the two sets of terminals, terminals 7 and 2 or terminals 5 and 4 respectively. For example, terminal 7 may connect to a first output terminal 222 that in turn is connected to the positive terminal of the load device circuitry 112 and terminal 2 may connect to a second output terminal 224 that in turn is connected to the negative terminal of the load device circuitry 112. Terminal 5 may connect to the second output terminal 224 that in turn is connected to the negative terminal of the load device circuitry 112 and terminal 4 may connect to the first output terminal 222 that in turn is connected to the positive terminal of the load device circuitry 112.

For example, when an input current pulse flows through terminals 8 and 1, the switches 218 and 220 may be actuated to make a connection to terminals 7 and 2 or terminals 5 and 4 depending on the polarity of the input current pulse. For example, when the latch relay bias device 108 is biased such that an input current pulse flows from terminal 8 to terminal 1 of the latch relay circuit 216, the switch 218 may be actuated to make contact with terminal 7 of the latch relay circuit 216 and the switch 220 may be actuated to make contact with terminal 2 of the latch relay circuit 216.

In some examples, once the switches 218, 220 are actuated to make a connection to terminals 7 and 2, the switches 218, 220 may remain in the same position, without breaking contact with terminals 7 and 2, even after the input current pulse has stopped flowing. The switches 218, 220 may continue to hold their position without consuming any additional power. Thus, the orientation agnostic battery placement circuit 106 may only consumer power to momentarily bias the latch relay bias device 108, which in turn controls the operation of the latch relay 110. After the momentary use of power when the batteries are inserted into the battery compartment 105, the orientation agnostic battery placement circuit 106 does not consume any additional power throughout the operation of the load circuit. The orientation agnostic battery placement circuit 106 continues to operate without any additional power consumption until the next time the one or more batteries 204 are replace in the battery assembly 104 of the battery compartment 105.

For example, the switches 218, 220 may only be actuated to break contact with terminals 7 and 2 by applying an input current pulse with a reverse polarity than the initial input pulse. When the latch relay bias circuit 108 is biased such that an input current pulse flows from terminal 1 to terminal 8 of the latch relay circuit 216, the switch 218 may break contact with terminal 7 and may be actuated to make contact with terminal 5 of the latch relay circuit 216 and the switch 220 may break contact with terminal 2 and may be actuated to make contact with terminal 4 of the latch relay circuit 216.

Figure 3:
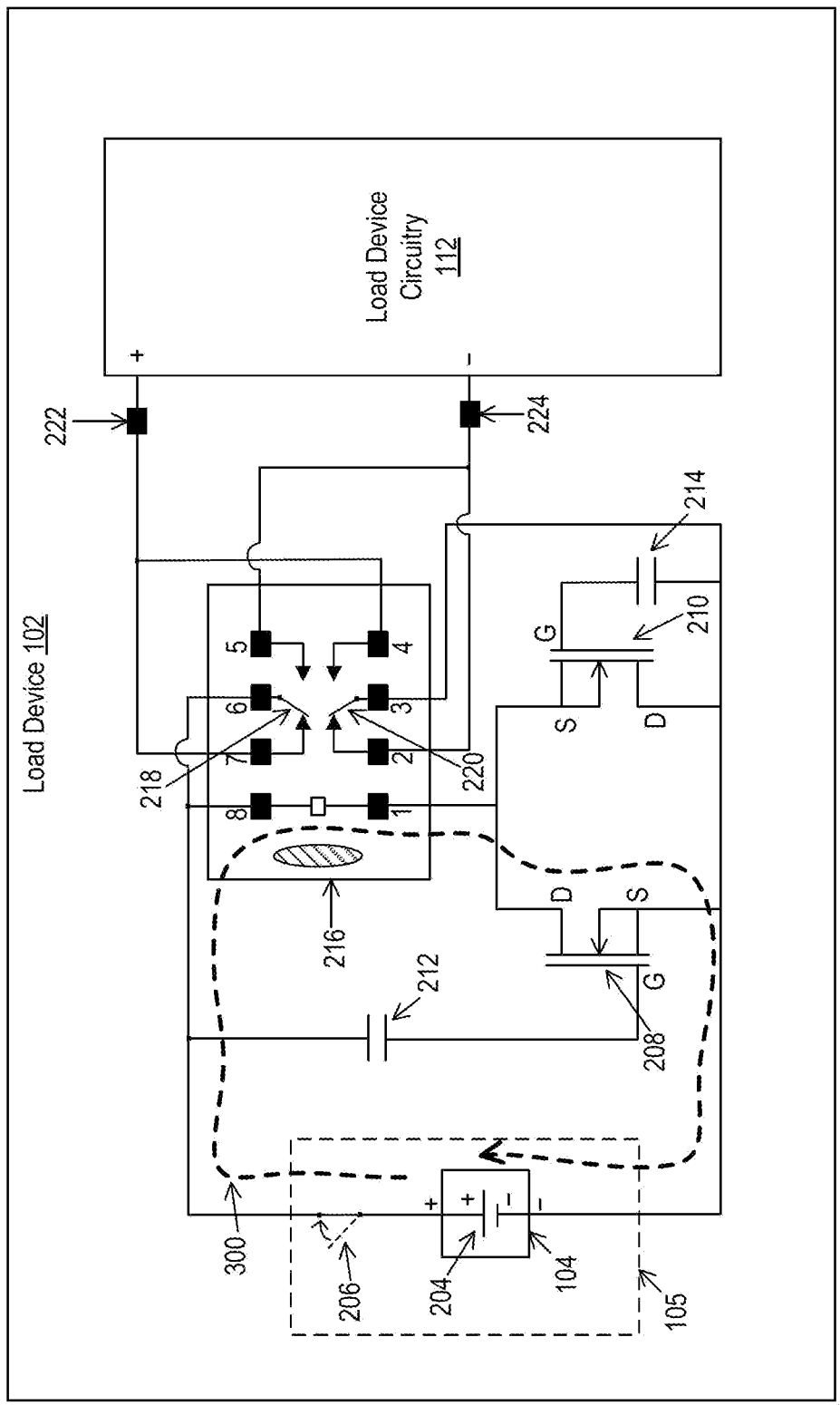
FIG. 3 illustrates an example configuration of the electronic device including an orientation agnostic battery placement circuit in which the battery assembly is installed in a first orientation.
Figure 4:
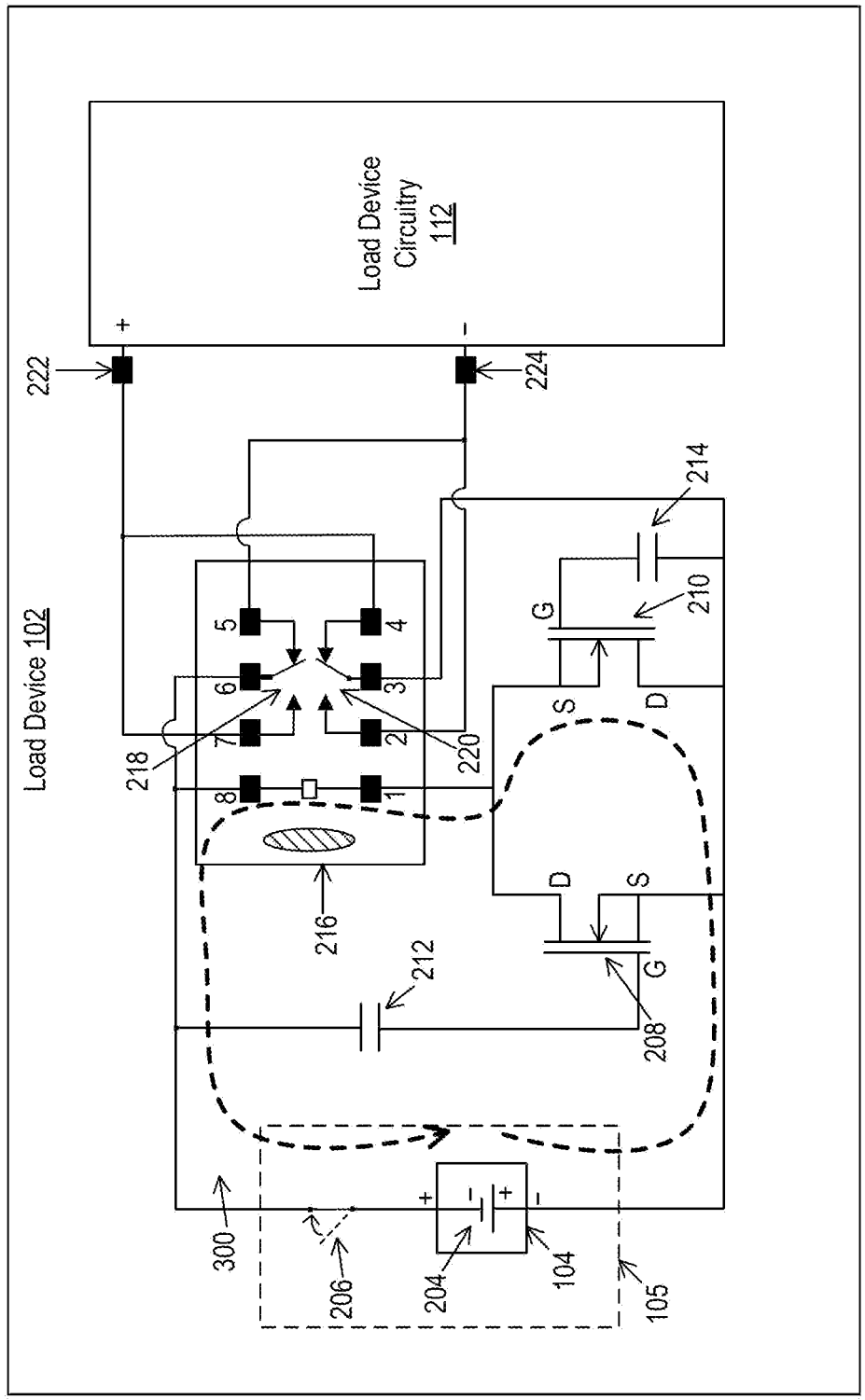
FIG. 4 illustrates an example configuration of the electronic device including an orientation agnostic battery placement circuit in which the battery assembly is installed a second orientation in which terminal connections are reversed relative to the first orientation.

The orientation of the one or more batteries 204 as installed within the battery compartment 105 and the direction of current flow within the orientation agnostic battery placement device 106, and how the direction of current flow biases the latch relay device 110 is described in greater detail in relation to FIGS. 3 and 4.

FIG. 3 illustrates an example configuration of the orientation agnostic battery placement system 100 where the battery is installed in a correct orientation.

In the disclosed example from FIG. 3, the one or more batteries 204 may be installed in a first orientation. For example, the positive terminal of the one or more batteries 204 may be connected to the positive terminal of the battery compartment 105 and the negative terminal of the one or more batteries 204 may be connected to the negative terminal of the battery compartment 105. FIG. 3 illustrates the pathway 300 of the flow of current when the one or more batteries 204 may be installed with the correct orientation.

When the batteries are installed in this first orientation, and the switch 206 is closed momentarily such that the battery placement device 204 makes an electrical connection with the latch relay bias circuit 108 and the latch relay circuit 216, the capacitor 212, connected to the gate terminal of the transistor 208, may be charged. The pulse voltage from the capacitor 212 can turn the transistor 208 on momentarily. The capacitor 214, which is connected to the negative terminal of the one or more batteries 204 may not be charged and thus may result in the transistor 210 being turned off.

In some examples, when transistor 208 is turned on and transistor 210 is turned off, the pathway of the current flow, as illustrated by the pathway 300, is from the positive terminal of the one or more batteries connected to the positive terminal of the battery compartment 105 to terminal 8 of the latch relay circuit 216, from terminal 8 of the latch relay circuit 216 to terminal 1 of the latch relay circuit 216, from terminal 1 of the latch relay circuit 216 to the drain terminal of the transistor 208, from the drain terminal of the transistor 208 to the source terminal of the transistor 208 and from the source terminal of the transistor 208 to the negative terminal of the one or more batteries connected to the negative terminal of the battery compartment 105.

When the direction of the current, illustrated by the pathway 300, is from terminal 8 to terminal 1 of the latch relay circuit 216, the latch relay circuit 216, as described in relation to FIG. 2, causes switch 218 to be actuated to make an electrical connection with terminal 7 and causes switch 220 to be actuated to make an electrical connection with terminal 2 of the latch relay circuit 216.

For example, when switch 218, which is connected to terminal 6 of the latch relay circuit 216, is actuated to make an electrical connection with terminal 7, which is connected to first output terminal 222 that in turn is connected to the positive terminal of the load device circuitry 112, the positive terminal of the one or more batteries 204 is electrically connected to positive terminal of the load device circuitry 112. In other words, the positive terminal of the one or more batteries 204, which is connected to the positive terminal of the battery compartment, makes an electrical connection with terminal 6 of the latch relay circuit 216, which in turn makes an electrical connection with terminal 7 through switch 218, which in turn makes an electrical connection with the first output terminal 222, which in turn makes a connection to the positive terminal of the load device circuitry 112. Thus, when the one or more batteries are installed in the correct orientation, the positive terminals of the one or more batteries 204 makes an electrical connection with the positive terminal of the load device circuitry 112.

For example, when switch 220, which is connected to terminal 3 of the latch relay circuit 216, is actuated to make an electrical connection with terminal 2, which is connected to the second output terminal 224 that in turn is connected to the negative terminal of the load device circuitry 112, the negative terminal of the one or more batteries 204 is electrically connected to the negative terminal of the load device circuitry 112. In other words, the negative terminal of the one or more batteries 204, which is connected to the negative terminal of the battery compartment 105, makes an electrical connection with terminal 3 of the latch relay circuit 216, which in turn makes an electrical connection with terminal 2 through switch 220, which in turn makes an electrical connection with the second output terminal 224, which in turn makes a connection to the negative terminal of the load device circuitry 112.

Thus, when the one or more batteries 204 are installed in the correct orientation, the positive terminal of the one or more batteries 204 makes an electrical connection with the positive terminal of the load device circuitry 112 and the negative terminal of the one or more batteries 204 makes an electrical connection with the negative terminal of the load device circuitry 112.

FIG. 4 illustrates an example configuration of the orientation agnostic battery placement system 100 where the battery is installed a reverse orientation.

In the disclosed example from FIG. 4, the one or more batteries 204 may be installed in a reverse orientation. For example, the positive terminal of the one or more batteries 204 may be connected to the negative terminal of the battery compartment 105 and the negative terminal of the one or more batteries 204 may be connected to the positive terminal of the battery compartment 105. FIG. 4 illustrate the pathway 400 of the flow of current when the one or more batteries 204 may be installed with the reverse orientation.

When the batteries are installed with the reverse orientation and the switch 206 is closed such that the batteries 204 makes an electrical connection with the latch relay bias circuit 108 and the latch relay 110, the capacitor 214, connected to the gate terminal of the transistor 210, may be charged. The pulse voltage from the capacitor 214 can turn the transistor 210 on momentarily. The capacitor 212, which is connected to the negative terminal of the one or more batteries 204 may not be charged and thus may result in the transistor 208 being turned off.

In some examples, when transistor 210 is turned on and transistor 208 is turned off, the pathway of the current flow, as illustrated by the pathway 400, is from the positive terminal of the one or more batteries connected to the negative terminal of the battery compartment 105 to the drain terminal of the transistor 210, from the drain terminal of the transistor 210 to the source terminal of the transistor 210, from the source terminal of the transistor 210 to terminal 1 of the latch relay circuit 216, from terminal 1 of the latch relay circuit 216 to terminal 8 of the latch relay circuit 216, from terminal 8 of the latch relay circuit 216 the negative terminal of the one or more batteries 204 connected to the positive terminal of the battery compartment 105.

When the direction of the current, illustrated by the pathway 400, is from terminal 1 to terminal 8 of the latch relay circuit 216, the latch relay circuit 216, as described in relation to FIG. 2, causes switch 218 to be actuated to make an electrical connection with terminal 5 and causes switch 220 to be actuated to make an electrical connection with terminal 4 of the latch relay circuit 216.

For example, when switch 220, which is connected to terminal 3 of the latch relay circuit 216, is actuated to make an electrical connection with terminal 4, which is connected to the positive terminal of the load device circuitry 112, the positive terminal of the one or more batteries 204 is electrically connected to the positive terminal of the load device circuitry 112. In other words, the positive terminal of the one or more batteries 204, which is connected to the negative terminal of the battery compartment 105, makes an electrical connection with terminal 3 of the latch relay circuit 216, which in turn makes an electrical connection with terminal 4 through switch 220, which in turn makes an electrical connection with the positive terminal of the load device circuitry 112.

For example, when switch 218, which is connected to terminal 6 of the latch relay circuit 216, is actuated to make an electrical connection with terminal 5, which is connected to the negative terminal of the load device circuitry 112, the negative terminal of the one or more batteries 204 is electrically connected to negative terminal of the load device circuitry 112. In other words, the negative terminal of the one or more batteries 204, which is connected to the positive terminal of the battery compartment 105, makes an electrical connection with terminal 6 of the latch relay circuit 216, which in turn makes an electrical connection with terminal 5 through switch 218, which in turn makes an electrical connection with the negative terminal of the load device circuitry 112. Thus, when the one or more batteries are installed in the reverse orientation, the negative terminal of the one or more batteries 204 makes an electrical connection with the negative terminal of the load device circuitry 112.

Thus, when the one or more batteries 204 are installed in the correct orientation, the positive terminal of the one or more batteries 204 makes an electrical connection with the positive terminal of the load device circuitry 112 and the negative terminal of the one or more batteries 204 makes an electrical connection with the negative terminal of the load device circuitry 112. Therefore, when the one or more batteries 204 are installed in the reverse orientation, the orientation agnostic battery placement device 106 may be configured to flip the orientation of the battery terminals before connecting the battery terminals to the load device circuitry.

What is claimed is:

1. A battery-powered electronic device comprising:
    load circuitry having a positive electrical power connection and a negative electrical power connection;
    a battery compartment having a first terminal and a second terminal, the battery compartment being arranged and configured for receipt of a battery having a positive terminal and a negative terminal;
    a latch relay electrically connected between the load circuitry and the first and second terminals of the battery compartment,
    the latch relay comprising: a first latch switch electrically connected to the first terminal,
        the first latch switch connecting the first terminal to: the positive electrical power connection of the load circuitry, in a state where the first terminal is electrically contacted by the positive terminal of the battery; and
        the negative electrical power connection of the load circuitry, in a state where the first terminal is electrically contacted by the negative terminal of the battery; and
    a second latch switch electrically connected to the second terminal,
        the second latch switch connecting the second terminal to: the negative electrical power connection of the load circuitry, in a state where the second terminal is electrically contacted by the negative terminal of the battery; and
        the positive electrical power connection of the load circuitry, in a state where the second terminal is electrically contacted by the positive terminal of the battery; and
    a latch relay bias circuit electrically connected between the first and second terminals of the battery compartment and the latch relay, wherein the latch relay bias circuit comprises a first transistor, a second transistor, a first capacitor and a second capacitor.

2. The electronic device of claim 1, wherein the first transistor is an NMOS transistor that includes a first drain terminal, a first source terminal and a first gate terminal and the second transistor is a NMOS transistor that includes a second drain terminal, a second source terminal and a second gate terminal.

3. The battery-powered electronic device of claim 2, wherein:
    the first drain terminal and the second source terminal are connected to a first input terminal of the latch relay;
    the first source terminal and the second drain terminal are connected to the second terminal of the battery compartment;
    the first gate terminal is connected to a first capacitor terminal of the first capacitor, wherein a second capacitor terminal of the first capacitor is connected to the first terminal of the battery compartment;
    the second gate terminal is connected to a third capacitor terminal of the second capacitor, wherein a fourth capacitor terminal of the second capacitor is connected to the second terminal of the battery compartment; and
    the first terminal of the battery compartment is connected to a second input terminal of the latch relay device.

4. The battery-powered electronic device of claim 3, wherein:
    a current flowing between the second input terminal of the latch relay and the first input terminal of the latch relay is an input current to the latch relay.

5. The battery-powered electronic of claim 1, wherein the latch relay bias circuit controls the direction of an input current to the latch relay based on an orientation of the battery received within the battery compartment.

6. The battery-powered electronic device of claim 5, wherein:
    the latch relay bias circuit causes the input current to flow in a first direction when the positive terminal of the battery is connected to the first terminal of the battery compartment and the negative terminal of the battery is connected to the second terminal of the battery compartment; and
    the latch relay bias circuit causes the input current to the latch relay to flow in a second direction when the negative terminal of the battery is connected to the first terminal of the battery compartment and the positive terminal of the battery is connected to the second terminal of the battery compartment.

7. The battery-powered electronic device of claim 1, wherein the first terminal of the battery compartment is further connected to a control switch that, when closed, provides power to the latch relay bias circuit and that when open does not provide power to the latch relay bias circuit.

8. The battery-powered electronic device of claim 1, wherein the latch relay is a magnetic latch relay circuit.

9. The battery-powered electronic device of claim 1, wherein the battery-powered electronic device is an image acquisition device.

10. A battery-powered electronic device comprising:
    load circuitry having a positive electrical power connection and a negative electrical power connection;
    a battery compartment having a first terminal and a second terminal, the battery compartment being arranged and configured for receipt of a battery having a positive terminal and a negative terminal;
    a latch relay, connected between the load circuitry and the first and second terminals of the battery compartment,
    the latch relay having a first input terminal, a second input terminal, a first latch switch and a second latch switch and being configured to:
        upon receiving an input current between the first input terminal and the second input terminal in a first direction, actuate the first latch switch to connect the first terminal of the battery compartment to the positive electrical power connection of the load circuitry and the second terminal of the battery compartment to the negative electrical power connection of the load circuitry; and upon receiving the input current between the first input terminal and the second input terminal in a second direction, mechanically actuate the first latch switch to connect the first terminal of the battery compartment to the negative electrical power connection of the load circuitry and mechanically actuate the second latch switch to connect the second terminal of the battery compartment to the positive electrical power connection of the load circuitry;

a latch bias circuit electrically connected to the first terminal and the second terminal of the battery compartment and configured to control the direction of the input current between the first input terminal and the second input terminal of the latch relay based on an orientation of the battery received within the battery compartment; and a latch relay bias circuit electrically connected between the first and second terminals of the battery compartment and the latch relay, wherein the latch relay bias circuit comprises a first transistor, a second transistor, a first capacitor and a second capacitor.

11. The battery-powered electronic device of claim 10, wherein:

the latch relay bias circuit causes the input current to flow in the first direction when the positive terminal of the battery is connected to the first terminal of the battery compartment and the negative terminal of the battery is connected to the second terminal of the battery compartment; and the latch relay bias circuit causes the input current to the latch relay to flow in the second direction when the negative terminal of the battery is connected to the first terminal of the battery compartment and the positive terminal of the battery is connected to the second terminal of the battery compartment.

12. The battery-powered electronic device of claim 10, wherein the first transistor is an NMOS transistor that includes a first drain terminal, a first source terminal and a first gate terminal and the second transistor is a NMOS transistor that includes a second drain terminal, a second source terminal and a second gate terminal.

13. The battery-powered electronic device of claim 12, wherein:

the first drain terminal and the second source terminal are connected to a first input terminal of the latch relay;

the first source terminal and the second drain terminal are connected to the second terminal of the battery compartment;

the first gate terminal is connected to a first capacitor terminal of the first capacitor, wherein a second capacitor terminal of the first capacitor is connected to the first terminal of the battery compartment;

the second gate terminal is connected to a third capacitor terminal of the second capacitor, wherein a fourth capacitor terminal of the second capacitor is connected to the second terminal of the battery compartment; and the first terminal of the battery compartment is connected to a second input terminal of the latch relay device.

14. The battery-powered electronic device of claim 10, wherein the latch relay is a magnetic latch relay circuit.

15. An orientation agnostic battery placement device comprising:

a battery compartment having a first terminal and a second terminal, the battery compartment being arranged and configured for receipt of a battery having a positive terminal and a negative terminal;

a latch relay comprising:
  a first output terminal;
  a second output terminal;
  a first latch switch electrically connected to the first terminal of the battery compartment,
    the first latch switch connecting the first terminal to:
      the first output terminal, in a state where the first terminal is electrically contacted by the positive terminal of a battery; and
  and
  a second latch switch electrically connected to a second terminal of the battery compartment,
    connecting the second terminal to: the second output terminal, in a state where the second terminal is electrically contacted by the negative terminal of the battery; and
    the first output terminal, in a state where the second terminal is electrically contacted by the positive terminal of the battery;

a latch bias circuit electrically connected between the latch relay and the first and second terminals of the battery compartment; and a latch relay bias circuit electrically connected between the first and second terminals of the battery compartment and the latch relay, wherein the latch relay bias circuit comprises a first transistor, a second transistor, a first capacitor and a second capacitor.

16. The orientation agnostic battery placement device of claim 15, wherein the latch bias circuit comprises:

a first NMOS transistor including a first drain terminal, a first source terminal and a first gate terminal;

a second NMOS transistor including a second drain terminal, a second source terminal and a second gate terminal; and wherein,
  the first drain terminal and the second source terminal are connected to a first input terminal of the latch relay;
  the first source terminal and the second drain terminal are connected to the second terminal of the battery compartment;
  the first gate terminal is connected to a first capacitor terminal of a first capacitor and a second capacitor terminal of the first capacitor is connected to the first terminal of the battery compartment;
  the second gate terminal is connected to a third capacitor terminal of a second capacitor and a fourth capacitor terminal of the second capacitor is connected to the second terminal of the battery compartment; and
  the first terminal of the battery compartment is connected to a second input terminal of the latch relay device.

17. The orientation agnostic battery placement device of claim 15, wherein the first output terminal is connected to a positive electrical power connection of a load circuitry and the second output terminal is connected to a negative electrical power connection of the load circuitry.

18. The orientation agnostic battery placement device of claim 17 wherein the load circuitry controls operation of a battery-operated imaging acquisition device.

* * * * *